United States Patent Office 3,733,405
Patented May 15, 1973

3,733,405
STABILIZER FOR ETHYLENE DIAMINE DIHYDRIODIDE
Donald J. Derrig, Watkins Glen, N.Y., assignor to Watkins Salt Company
No Drawing. Continuation-in-part of abandoned application Ser. No. 753,740, Aug. 19, 1968. This application May 10, 1971, Ser. No. 142,005
Int. Cl. A01k 27/00
U.S. Cl. 424—171         13 Claims

ABSTRACT OF THE DISCLOSURE

This invention relates to a method of stabilizing ethylene diamine dihydriodide (EDDI) so as to prevent the release of iodide or iodine, particularly in the presence of moisture. This stabilized product may be used by itself or blended with various animal feeds so as to provide medicaments and nutrients therein. The stabilizer is selected from the group consisting of hemicellulose extract, lignosulfonate, caramel, wood sugar and molasses.

CROSS-REFERENCE TO RELATED APPLICATION

This application is a continuation-in-part of U.S. patent application Ser. No. 753,740 filed Aug. 19, 1968, now abandoned.

BACKGROUND OF THE INVENTION

The use of iodine as an animal feed additive for nutritional and medicinal purposes is well known. Various compounds have been used to provide stable and available iodine for these purposes. Potassium iodide, sodium iodide, calcium iodate, thymbol iodide, and cuprous iodide are several of the more frequently used compounds. EDDI has been shown to be a very effective feed additive as a nutritional source of iodine and as an excellent medicament for the prevention of foot rot, simple goiter and soft tissue lumpy jaw in dairy and beef cattle. U.S. Patent No. Re. 21,528 is the basic patent relating to EDDI. This patent basically teaches the use and advantages of EDDI as an internal medication. The patent also discloses that EDDI is readily soluble in water, that it may be administered in solution and that the taste of the EDDI in water may be disguised by the addition of various agents. Other patents further elaborate on the solubility of EDDI in water and take advantage of that property; see, for example, U.S. Patent No. 2,211,837.

Although the solubility of EDDI is advantageous in some situations, it has presented a difficult problem in its use as an additive to animal feeds. Moisture which contacts the EDDI causes the release of iodine or iodide which can render the feed unpalatable and give it an unpleasant aroma. Furthermore, with the release of iodine or iodide the amount thereof available for medicinal and nutritional purposes is reduced. Moreover, the released iodine can discolor the feed, discolor bags by reacting with starch in the paper and possibly cause decomposition of other feed ingredients. As a result, the best way to add EDDI to the feed has been to add the EDDI at the time of feeding and only in the amount to be used. Although the above is the best way to add EDDI to the feed, feeds are commercially available which contain EDDI therein. However, these feeds exhibited the following problems. If the feed were allowed to stand open, it would release iodine or iodide as a result of the natural collection of moisture thereon. The moisture present from the animal's saliva can also contribute to iodine or iodide release. Moreover, EDDI was difficult to control, if at all, in any manufacturing operation where moisture or water was used; as, for example, in the manufacture of molded salt blocks where a small amount of water is used. In the case of bagged mixtures of salt and EDDI, the release of iodine is slower but over a period of several weeks iodine or iodide release is noted. Of course, in opened and partially used bags, the release occurs more rapidly. In addition to other source of moisture, the EDDI and other ingredients may contain moisture as manufactured. Hence, although the advantages and beneficial effects of EDDI are well known, the compound could not truly be used successfully due to its instability, particularly in a moist or aqueous environment.

The problem of stability of iodine containing compounds is not unique to EDDI, potassium iodide is normally stabilized with dextrose and sodium bicarbonate or sodium thiosulfate and sodium bicarbonate. These stabilizers were tried with EDDI but found to be unsatisfactory. Dextrose did not prevent the release of iodine; and sodium thiosulfate was unstable and unpalatable in the amounts required to stabilize the EDDI. Another potential stabilizer was sodium metabisulfite, but it was unpalatable, unstable, and had an unpleasant aroma when used in the amounts necessary to stabilize the EDDI.

Although starch may be used to complex the liberated iodine, it has the disadvantage of forming an extremely dark colored complex with even small amounts of iodine. This would be detrimental to product appearance since the products are either white or light in color. Also, starch has limited solubility and would tend to be inefficient.

Therefore, in order to fulfill the true commercial potential of EDDI it was necessary to prevent the release of iodine or iodide, particularly in moist environments; which in effect, meant under all conditions of normal usage.

SUMMARY OF THE INVENTION

I have discovered that EDDI can be stabilized by blending it with various materials individually or in combination. These materials include hemicellulose extract, lignosulfonate (such as from the sulfite pulping of wood), wood sugars (produced in the same sulfite pulping) caramel, and molasses. These materials have both iodine complexing properties and reducing properties even in an acid medium. The property of having reducing action in an acid medium is important in the stabilization of EDDI since EDDI itself is acid in solution. A solution of EDDI has a pH of about 4. The complexing properties provide additional capacity to hold released iodine if there is not enough reducing capacity available or until the reduction can take place.

Dextrose (glucose), xylose, fructose, lactose etc., which are reducing mono and disaccharides are incapable of stabilizing EDDI as shown by tests summarized hereinafter. These reducing sugars do not have reducing properties in acid medium with respect to iodine-iodide solutions.

Even when the medium is made alkaline, by the addition of sodium bicarbonate, the materials of this invention react much more rapidly to reduce free iodine than do dextrose, xylose etc. For example, a quantity of the stabilizers will reduce iodine in a basic iodine-iodide solution almost instantly; whereas dextrose, xylose, frustose, lactose etc., at several times the quantity will take hours to completely reduce the iodine.

Effective amounts of my stabilizing materials will stabilize EDDI by itself or when blended with the animal feed. In general, these compounds are tasteful, have a pleasant aroma, are nutritious in and of themselves, and have no known adverse effects. The Food and Drug Administration, has placed a maximum on the amount of some of these materials which can be used. However, the scope of my invention, from a stabilization point of view, is not limited by the FDA maximum; but, the use and practice of my invention is so limited. Although some of these materials have not as yet received FDA approval, this could be obtained.

DESCRIPTION OF THE PREFERRED EMBODIMENT

Theory

It is believed that when EDDI and water come in contact, the EDDI is dissolved in the water and the ionically bonded iodide ion is released. The ion may then remain as the anion ($I^-$), form an iodine molecule ($I_2$), or form the tri-iodide anion. In any case, the structure of the iodide or iodine molecule is such that it is very polar. The presence of a polar polymeric molecule will be sufficient to attract the iodide or iodine molecule to the polymeric molecule. These polymeric molecules are believed to generally have a helical shape such that the iodide or iodine molecule will assume a position within the helix. Furthermore, the longer the chain, the greater the attraction and ability to stabilize the EDDI by complexing of any liberated iodine. In addition, the polymeric compounds of this invention have active reducing groups capable of reducing any liberated iodine. These reducing groups are effective even in the acid media formed by EDDI solutions. As an example; EDDI can be added in excess with calcium iodate in a water solution made acid with sulfuric acid to a pH of about 3. Starch is then added as an indicator. Titration with hemicellulose extract, caramel, etc., reduces the free iodine until the blue iodine starch complex disappears. It is noted that the materials of this invention are able to remove iodine from the iodine-starch complex and thereby lighten the color of the solution. A second solution is also prepared, without the starch, for the purpose of color comparison to permit the determination of when all the iodine has been reduced.

If hemicellulose extract is added to the solution without the starch indicator a dark brown complex is formed, as more hemicellulose extract is added its reducing action removes the iodine from the hemicellulose extract-iodine complex and the solution becomes lighter in color until the complex is completely destroyed. If a large excess of hemicellulose extract is added initially, the complex is not formed sufficiently to observe the typical dark brown color.

Tests under acid conditions with iodine-iodide solutions as well as direct tests with EDDI and EDDI-salt mixtures have shown that dextrose (glucose) xylose, fructose, lactose, and the like, are ineffective as stabilizers. These tests prove that the simple sugar content (the mono and disaccharides), of hemicellulose extract, caramel and sulfite pulping liquor wood sugars are not active components. Therefore, the pentosan and hexosan polymers or polysaccharides are the active portion.

This is further illustrated as follows: Caramel is prepared in the laboratory by controlled heating of normally ineffective and nonreducing sucrose cane sugar. The prepared polymerized mixture attains reducing power in acid iodine-iodide solutions and effectively stabilizes EDDI-salt product mixtures. Commercial caramel prepared under FDA standards of identity is also effective as shown in Table III.

Durabond a proprietary material made by the Cargill Co. is a direct mixture of lignosulfonates and wood sugar obtained from the by-product liquors in sulfite pulping of wood. One of the Durabond products, "Special Durabond" has the mono and disaccharide sugars removed and contains only calcium lignosulfonate and the wood sugar polymers. The composition of the two Durabond products as taken from published Cargill Literature is as follows:

| Composition | Regular Durabond, percent | Special Durabond, percent |
| --- | --- | --- |
| Inorganics | 2 | 2 |
| Calcium lignosulfonate | 47 | 47 |
| Reducing sugars | 25 | 3 |
| Carbohydrate polymers | 26 | 46 |
| Others | | 2 |

Special Durabond is shown to be more effective than regular Durabond in Table III. It is also shown to be more effective than lignosulfonate alone in Table I. This again indicates that the pentosan and hexosan sugar polymers are the active carbohydrate portion.

TABLE I

TABLE I.—STABILIZER TO IODINE RATIOS

| Materials | Source | Composition | Ratio, stab./iodine |
| --- | --- | --- | --- |
| Masonex | Masonite Corp | Simple sugars and sugar polymers | 65/1. |
| Durabond, special | Cargill Corp | Calcium lignosulfonate and sugar polymers | 87/1. |
| Marasperse N | American Can Co | Sodium lignosulfonate | 137/1. |
| Caramel [1] | Laboratory prepared | Sugar polymers and unknown | 180/1. |
| Dextrose | Corn Products Co | Dextrose (glucose) | No reaction. |
| Xylose, lactose | Baker reagents | | Do. |
| Fructose | do | | Do. |

[1] Commercial caramel is more effective as noted in Table III.

The data presented in Table I was prepared by the titration techniques previously described and shows the quantities of stabilizer need to reduce the free iodine-not necessarily stabilize the EDDI.

The high ratios of stabilizer to iodine required for complete reaction as in Table I, compared with the extremely low ratios, shown in Table III actually required for stabilization, indicate that it is a true stabilization effect rather than a reaction combination with EDDI.

The patent literature defines methods of separating the simple sugars from the polysaccharides in hemicellulose extract and in sulfite wood pulping by-product liquors. Examples are the Boehm Patent No. 2,465,347 assigned to the Masonite Corp., and the Adams Patent No. 2,905,558 assigned to the American Can Co. Apparently none of these polysaccharides are available commercially as separated by the described methods so they could not be tested as such; however, it is clear that they could be used alone if available for the purposes described. It is quite apparent that the sugars found in hemicellulose extract and in sulfite pulping by-product liquors are essentially the same consisting of pentose and hexose; mono and disaccharides and polymers of the same. It is understood that the amount of these sugars present in any material will vary depending on the type of wood and method of treatment.

Based upon my findings materials which contain hexosans and pentosans (i.e. polysaccharides) or lignosulfonates are effective stabilizers; typically the hexosans and pentosans are found in caramel, hemicellulose extract, molasses and wood sugar from sulfite pulping operations; lignosulfonates are typically found in the liquors of the sulfite pulping also. The minimum effective ratio of the hexosan and pentosan content to EDDI is 1:1; this ratio permits proper blending of the stabilizer and EDDI.

In addition to the material stabilizing the EDDI, the stabilizers are palatable, non-toxic, have a pleasant aroma, should not discolor the feed, easily blended with the EDDI and/or feed. The stabilizers of my invention may be dry blended with the EDDI alone, or with EDDI and other ingredients, and then added to the feed in the commercial manner.

Salt feeds

In general, EDDI will be added to salt feed. This feed can be either in a particulate or a molded form. The salt feed can contain at least 90% sodium chloride with the balance comprising the various additives including minerals, vitamins, and other medicaments. Although a preferred embodiment of my invention is the stabilization of EDDI in salt feed, it is not limited thereto. My invention will stabilize EDDI when used alone or in other mixtures.

A salt-EDDI mixture usually contains about 0.175% EDDI, by weight, so that one ounce of the total product eaten will provide 50 milligrams of EDDI. This is the treatment level of EDDI per head of cattle per day allowed by the FDA for the prevention of foot rot. I have found that a certain minimum of stabilizer is required to assure proper distribution and mixture of the EDDI and stabilizer. It will be appreciated that if the FDA maximum on EDDI were increased, the minimum amount of stabilizer would also have to be increased proportionally. I have found that a very important parameter in determining the amount of stabilizer to be used is the ratio of the weight of stabilizer to the weight of EDDI. Furthermore, this ratio is a minimum so that any ratio greater than it will provide the desired stabilization. Of course, this ratio must be considered in relation with FDA maximum when the product is prepared.

Stabilizers

Materials which have been found to be effective as stabilizers are identified as follows: hemicellulose extract, lignosulfonates, caramel, wood sugar, molasses, and the polysaccharide fractions thereof.

Hemicellulose extract has been broadly defined as a by-product of the manufacture of pressed woods. It is a concentrated soluble material obtained from the treatment of wood at elevated temperature and pressure without the use of acids, alkalis or salts. It contains the previously identified pentose and hexose sugars and has a total carbohydrate content of not less than 55%. This definition was adopted in 1966 by the Association of American Feed Control Officials, Incorporated and may be found in their official publication. Hemicellulose extract which falls within the previously provided definition may be manufactured by the processes set forth in U.S. Patents No. 1,578,609; 1,824,221; 2,224,135 and 2,465,437 the teachings of which are incorporated herein by reference and all of which Column 1, lines 19–33 the process for manufacturing is set out as follows: "Lignose cellulose material in the form of coarsely divided chips is subjected to saturated steam at pressures of about 600 to 1,000 lbs. per square inch and at corresponding temperatures (250° C.–285° C.) in a gun for a short period of time. As the result of the hydrolysis treatment, the water soluble materials are increased and the liquor thus obtained from the hydrolysis treatment is used as the starting materials . . . The wood liquor obtained as described contains materials produced from the hemicellulose materials of the wood by the high pressure steam treatment, and which are soluble or dispersible in water." The precise nature of hemicellulose extract has not been determined in terms of composition or material characteristics although the broad characteristics and its process of manufacture have been clearly delineated as previously set forth. One form of hemicellulose extract which can be used as a stabilizer herein and meets the above provided definition is manufactured by the Masonite Corporation under the trade name Masonex. The Masonex can be obtained in either the dry or liquid form.

The variability in the Masonex hemicellulose extract produced is illustrated by comparing the typical analysis of Masonex from two sources as taken from their literature.

TABLE II.—TYPICAL ANALYSIS

| | Source | |
|---|---|---|
| | Laurel, Miss. | Ukiah, Calif. |
| Liquid Masonex (percent): | | |
| Solids | 65 | 65 |
| Total carbohydrates | 55 | 55 |
| Simple sugars | 10 | 24 |
| Sugar polymers (by difference) | 45 | 31 |
| Simple sugars after hydrolysis | 35 | 42 |
| Distribution of sugars after hydrolysis: | | |
| Glucose | 14 | 17 |
| Mannose | 27 | 45 |
| Galactose | 8 | 13 |
| Arabinose | 5 | 4 |
| Xylose | 46 | 21 |
| pH | 5.5 | 5.5 |
| Spray dried Masonex (percent): | | |
| Total carbohydrates | 84 | 84 |
| Simple sugars, calculated approximately | 15 | 36 |
| Sugar polymers, calculated approximately | 69 | 48 |

Another useful stabilizer is lignosulfonate. Lignosulfonate or ligninsulfonates are defined as sulfonate salts made from the lignin of sulphite pulp-mill liquors with molecular weights ranging from 1,000 to 20,000. This definition can be found in the Condensed Chemical Dictionary, seventh edition, Rheinhold Publishing Corporation. Yet another definition for lignosulfonates is presented by the American Association of Feed Control Officials and is given as "One or a combination of the ammonium, calcium, magnesium, or sodium salts of the extract of spent sulphite liquor derived from the sulphite digestion of wood." This definition was adopted in 1964. Yet another definition of the term lignosulfonate is provided in a paper entitled "Toxilogical Properties of Marathon Sulfonates" is issued by Marathon, a division of American Can Company. Lignosulfonates which may be used as stabilizers in this invention and which are within the above provided definitions are sold by Marathon under the trade names "Marasperse-N, Maracell-E, Maratan-SN and Maracarb-N. Specific definitions and compositional limitations for those materials are found in their Bulletin No. 130.

Caramel has been defined in the above-cited Chemical Distionary as a dark brown, deliquescent powder or a thick liquid having a bitter taste, a burnt sugar odor and a specific gravity of approximately 1.35. It is soluble in water and dilute alcohol. Definitions of caramel can be found in an article published in the November 1967 Packer-Processor magazine as well as in the standard issued by the Food Drug Administration published on June 25, 1963.

The description from the magazine, "Packer-Processor," is as follows: "Caramel production is a batch process using a reactor vessel which may be operated under pressure or not, depending on the type caramel to be made. Liquid sugar, either cane or corn, is pumped into the reactor along with one or a combination of the reagents authorized by the FDA standards of identity and the mixture is heated. Temperatures ranging from 250° F. to 500° F. are maintained and the product is held between 15 and 250 pounds per square inch pressure while the polymerization takes place. Tests are made during the reaction to determine the required processing time. When processing is completed the product is discharged to a flash cooler which drops the temperature to 150° F. It is then filtered, cooled and pumped to storage.

Chemically, caramel is an extremely complex material. Although we are slowly progressing toward understanding it, its structure still remains unknown." This article was by Gouverneur H. Nixon, president of the D. D. Williamson Co. Inc., a manufacture of caramel.

Wood Sugar is defined as the sugar by-product in the same sulfite wood pulping liquors from which the lignosulfonates are extracted. This would include both simple sugar and polysaccharides (pentosans and hexosans).

The term molasses as used herein has been defined in the above cited Chemical Dictionary as "The syrupy mother liquid left after sucrose has been removed from sugar cane or sugar beet juice." Many varieties of molasses are possible, depending on the stage at which the molasses is removed. Blackstrap molasses (or just blackstrap) is usually the syrup from which no more sugar can be obtained economically. Barrel syrup is a similar term. A typical analysis of cane blackstrap might be sucrose 30% reducing sugars 20%, ash 10%, organic non-sugar 20%, water 20%. Another definition of molasses has been set forth at page 42 of the Uniform State Feed Bill which has been adopted by the Association of American Feed Control Officials and endorsed by the American Feed Manufacturers Association, National Feed Ingredients Association and Pet Food Institute.

Preparation of stabilized feeds

When hemicellulose extract is used as the stabilizer for EDDI in either particulate or molded salt feed as set forth above, about 0.2% hemicellulose extract is the minimum amount necessary for the stabilization of 0.175% EDDI. Thus the weight ratio of hemicellulose extract to EDDI is 0.2/0.175 or about 1/1. Hemicellulose extract used here can be purchased from Masonite Corporation under the trade name Masonex. With salt blocks, to which small amounts of water is added, the maximum amount of stabilizer which can be used depends upon apparatus limitations with respect to mixing, viscosity, pressing, etc. Aside from equipment limitations, no upper limits exist except for an FDA maximum of 10% hemicellulose extract. In a bagged salt product, there is no practical maximum again except for that set by the FDA. The weight ratio herein is 0.2/0.175 or about 1/1. Other stabilizing materials were tested and the procedure and results are described hereinafter.

As part of the test procedure, fifty grams of a salt-mineral-EDDI mixture containing 0.175% EDDI was placed in a 12 oz. glass jar. The mixture used for these experiments contained, on a weight percent basis, between 96 and 99% sodium chloride, 0.175% EDDI, and minor amounts of the following ingredients, cobalt carbonate, copper oxide, iron carbonate, manganous oxide, sodium sulfate, zinc oxide, white mineral oil, yellow prussiate of soda and iron oxide. The stabilizer was dissolved, or dispersed, in 50 milliliters of water and then thoroughly mixed with the salt-mineral-EDDI mixture in the glass jar. A strip of iodine-starch test paper was moistened and taped to the inside of the jar cap and the cap screwed tightly onto the jar. If iodine was released, the paper turned blue. The minimum amount of stabilizer which could be used and prevent the test paper turning blue was determined and is set forth in Table III. This minimum corresponds to the minimum which can be used in the product. From this minimum, the ratio of stabilizer to EDDI was also determined and is also set forth in Table III. In addition to the chemical name, where appropriate, the trade name under which the stabilizers may be purchased in also listed, in parenthesis.

The minimum weight percent of stabilizer as set forth in Table III is based on the total weight of the salt-mineral-EDDI mixture. The minimum weight ratio of stabilizer to EDDI is based upon the weight of the stabilizer and the weight of the EDDI.

TABLE III

| Stabilizer | Minimum weight percent | Minimum weight ratio |
|---|---|---|
| 1... Hemicellulose extract (Masonex—spray dried). | 0.20 | 1.14/1 |
| 2... Lignosulfonate, sodium salt (Marasperse-N). | 0.20 | 1.14/1 |
| 3... Modified lignosulfonate (Maracell-E) | 0.20 | 1.14/1 |
| 4... Purified sodium lignosulfonate (Maratan-SN). | 0.12 | .71/1 |
| 5... Solution of lignosulfonates and wood sugars (Maracarb-N). | 0.25 | 1.43/1 |
| 6... Molasses (99% No. 1137 molasses solids, Food Concentrates Inc.). | 0.65 | 3.72/1 |
| 7... Caramel (B & C powdered, Sethness Products Co.). | 0.125 | 0.71/1 |
| 8... Brown sugar (dark) | 2.0 | 11.4/1 |
| 9... Dextrin, Staley Stadex, 60K | 5.0 | 28.6/1 |
| 10.. Starch, Staley pure food | (¹) | |
| 11.. Starch, boiled | 2.0 | 11.4/1 |
| 12.. Dry lignosulfonate, wood sugar mixture, Durabond by Cargill (special). | 0.2 | 1.14/1 |
| 13.. Regular Durabond | 0.3 | 1.71/1 |
| 14.. Dextrose | Ineffective at any ratio | |
| 15.. Xylose | Ineffective at any ratio | |
| 16.. Fructose | Ineffective at any ratio | |
| 17.. Lactose | Ineffective at any ratio | |

¹ Over 10%.

The specific stabilizers used in Examples 2–5 of Table III are sold under the trade names shown. A characteristics and composition of these materials are given by their manufacturers as follows:

(1) Marasperse-N is principally a sodium lignosulfonate having a typical analysis on a moisture free basis of:

Total Sulfur as S, percent _____ 5.30
Sulfate Sulfur as S, percent _____ 1.20
Sulfite Sulfur as S, percent _____ 0.06
CaO, percent _____ 0.63
MgO, percent _____ 0.95
$Na_2O$, percent _____ 10.00
$R_2O_3$, percent _____ 0.28
Reducing Sugars, percent _____ None
$OCH_3$, percent _____ 11.20

(2) Maratan-SN is characterised as highly purified sodium lignosulfonate, the composition of which is given broadly as:

Moisture Content, wt. percent _____ 2.90
Insolubles _____ .11
Ratio of tannin to soluble solids _____ 41.70
CaO, percent _____ .52
$Na_2O$, percent _____ 4.04
$Fe_2O_3$, percent _____ 0.011

(3) Maracarb-N is characterised as a complex mixture of the salts of lower molecular weight lingnosulfonic acids and the salts of the alkaline reversion products of hexoses and pentoses which are produced from wood in the sulfite pulping process. The typical analysis of which on a moisture free basis is set out as follows:

Maracarb-N-Liquid
Total sulfur as S (percent on dry solids) _____ 4.75
Sulfite and sulfate sulfur as S (percent on dry solids) _____ 0.43
Sulfate sulfur as S (percent on dry solids) _____ 0.39
Sulfite sulfur as S (percent on dry solids) _____ 0.04
Thiosulfate sulfur as S (percent on dry solids) ____ 0.19
CaO (percent on dry solids) _____ 0.06
MgO (percent on dry solids) _____ 0.03
$Na_2O$ (percent on dry solids) _____ 19.86
$R_2O_3$ (percent on dry solids) _____ 0.15
$SiO_2$ (percent on dry solids) _____ 0.06
Methoxyl (percent on dry solids) _____ 5.70
Fehling reduction, as glucose (percent on dry solids) _____ 0.40
Sodium acetate (percent on dry solids) _____ 15.20
Sodium formate (percent on dry solids) _____ 2.50
Sodium metaborate (percent on dry solids) _____
Sodium sesquecarbonate (percent on dry solids) __ 2.75

The composition of Maracarb N Liquid is given as:

| | Percent |
|---|---|
| Inorganic sodium salts | 5 |
| Carbohydrate and carbohydrate reversion products | 55–56 |
| Sodium lignosulfonate | 30–40 |

(3) Maracell E is described as a partially desulfonated sodium lignosulfonate; its composition is given on a moisture free basis as:

| | |
|---|---|
| Total sulfur as S, percent | 5.30 |
| Sulfate sulfur as S, percent | 2.36 |
| Sulfite sulfur as S, percent | 1.37 |
| Na, percent | 23.76 |
| CaO, percent | 0.04 |
| MgO, percent | 0.01 |
| $R_2O_3$, percent | 0.18 |
| Fe, percent | 0.03 |
| $CO_2$, percent | 4.56 |
| Sodium formate, percent | 3.30 |
| Sodium acetate, percent | 6.10 |
| Sodium oxalate, percent | 2.90 |
| $OCH_3$, percent | 5.16 |
| Reducing sugars | None |

Mixtures of various stabilizers such as hemicellulose extract and lignosulfonates also can be effective. Other carbohydrates of high molecular weight as indicated in Table III such as caramel, molasses, and wood sugar have also been found to be effective. I have found that commercially available molasses, usually blackstrap, may be used but I believe any molasses may be used.

As mentioned above, the stabilizer and EDDI can be pre-blended and added to the feed at the feeding site. On the other hand, the pre-blend can be blended into the feed at the factory; alternatively the feed, stabilizer, and EDDI can be blended together at the same time so as to provide the desired product. Thus, the stabilizer and EDDI can be blended together or into the feed using existing feed blending techniques. I have also found that these stabilizers can be used singly or in various combinations and still be effective.

If it is so desired, the present commercial practice of stabilization of iodine containing compounds to raise the pH of the mixture to about 7–8 or higher may be used to supplement the stabilizers of my invention. It should be appreciated that I can practice my invention without the use of this commercial practice.

What I claim and desire to secure by Letters Patent of the United States is:

1. An improved animal feed wherein said feed contains, in addition to other feed ingredients, a stabilized iodine-containing additive, comprising: (a) a nutritionally or therapeutically effective amounts of ethylene diamine dihydriodide; and (b) hemicellulose extract in a non-toxic amount effective to stabilize the ethylene diamine dihydriodide.

2. The feed of claim 1 wherein the weight ratio of hemicellulose extract to ethylene diamine dihydriodide is at least about 1:1.

3. The feed of claim 2 wherein one of said other feed ingredients is salt.

4. An improved animal feed wherein said feed contains in addition to other feed ingredients, a stabilized iodine-containing additive, comprising: (a) a nutritionally or therapeutically effective amount of ethylene diamine dihydriodide; and (b) caramel in a non-toxic amount effective to stabilize the ethylene diamine dihydriodide.

5. The feed of claim 4 wherein the weight ratio of caramel to ethylene diamine dihydriodide is at least about 1:1.

6. The feed of claim 5 wherein one of said other feed ingredients is salt.

7. An improved animal feed wherein said feed contains in addition to other feed ingredients, a stabilized iodine-containing additive, comprising: (a) a nutritionally or therapeutically effective amounts of ethylene diamine dihydriodide; and (b) wood sugar in a non-toxic amount effective to stabilize the ethylene diamine dihydriodide.

8. The feed of claim 7 wherein the weight ratio of wood sugar to ethylene diamine dihydriodide is at least about 1:1.

9. The feed of claim 8 wherein one of said other feed ingredients is salt.

10. An improved animal feed wherein said feed contains in addition to other feed ingredients, a stabilized iodine-containing additive, comprising: (a) a nutrtionally or therapeutically effective amount ethylene diamine dihydriodide; and (b) lignosulfonate in a non-toxic amount effective to stabilize the ethylene diamine dihydriodide.

11. The feed of claim 10 wherein the weight ratio of lignosulfonate to ethylene diamine dihydriodide is at least about 1:1.

12. The feed of claim 11 wherein one of said other feed ingredients is salt.

13. The feed of claim 10 wherein said lignosulfonate is selected from the group consisting of calcium lignosulfonate, sodum lignosulfonate, magnesium lignosulfonate and ammonium lignosulfonate.

References Cited
UNITED STATES PATENTS

| | | | |
|---|---|---|---|
| 1,013,913 | 1/1912 | Werner | 424—176 |
| 1,992,673 | 2/1935 | Moorman | 424—150 |
| 2,211,837 | 8/1940 | Rice et al. | 424—150 |
| 2,302,103 | 11/1942 | Carlson et al. | 424—176 |
| 2,962,416 | 11/1960 | Taylor | 424—176 |
| 3,039,916 | 6/1962 | Neracher et al. | 424—150 |
| 3,240,711 | 3/1966 | Wittwer | 424—150 |
| 3,278,373 | 10/1966 | Baker | 424—175 |

ALBERT T. MEYERS, Primary Examiner

F. E. WADDELL, Assistant Examiner

U.S. Cl. X.R.

424—150, 175, 176, 325